(12) United States Patent
Mayr

(10) Patent No.: US 10,415,296 B2
(45) Date of Patent: Sep. 17, 2019

(54) MOTOR VEHICLE HAVING AN AUTOMATICALLY CONTROLLABLE REAR-FLAP ASSEMBLY

(71) Applicant: Bayerische Motoren Werke Aktiengesellschaft, Munich (DE)

(72) Inventor: Juergen Mayr, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/437,721

(22) Filed: Feb. 21, 2017

(65) Prior Publication Data

US 2017/0159347 A1 Jun. 8, 2017

Related U.S. Application Data

(63) Continuation of application No. PCT/EP2015/069071, filed on Aug. 19, 2015.

(30) Foreign Application Priority Data

Aug. 22, 2014 (DE) .................. 10 2014 216 759

(51) Int. Cl.
*E05F 15/70* (2015.01)
*B60J 5/10* (2006.01)
(Continued)

(52) U.S. Cl.
CPC .............. *E05F 15/70* (2015.01); *B60J 5/101* (2013.01); *B60J 5/102* (2013.01); *B60J 5/103* (2013.01);
(Continued)

(58) Field of Classification Search
CPC ......... E05F 15/40; E05F 15/70; E05F 15/611; E05Y 2900/546; B60J 5/101; B60J 5/102;
(Continued)

(56) References Cited

U.S. PATENT DOCUMENTS 3,589,537 A * 6/1971 Peterson ............... B60P 1/4414
414/471
3,630,395 A * 12/1971 Bunge ................... B60P 1/4414
414/546
(Continued)

FOREIGN PATENT DOCUMENTS

CN 202755784 U 2/2013
CN 103249583 A1 8/2013
(Continued)

OTHER PUBLICATIONS espacenet translation of DE 10 2011 121 410 A1 (6 pages), dated Jun. 20, 2013.*

(Continued)

*Primary Examiner* — Dale W Hilgendorf
(74) *Attorney, Agent, or Firm* — Crowell & Moring LLP

(57) ABSTRACT

A motor vehicle has an automatically controllable rear-tailgate arrangement, which either is comprised of a single pivotable tailgate or a pivotable lower tailgate and a pivotable upper tailgate. An electronic control unit for the motorized control of the pivotable tailgates is associated with the rear-tailgate arrangement assembly. In particular, the control unit is designed to perform the following functionality by an appropriately programmed function module: the control unit evaluates information of a sensor unit for sensing the longitudinal tilt of the motor vehicle; after an opening command by an operating person, the control unit prevents complete opening either of the single rear tailgate or at least of the lower rear tailgate at least in the case of a rearward longitudinal tilt exceeding a defined threshold.

10 Claims, 1 Drawing Sheet

(51) Int. Cl.
- B60P 1/00 (2006.01)
- B60P 1/44 (2006.01)
- B60P 1/267 (2006.01)
- B62D 33/027 (2006.01)
- B62D 33/03 (2006.01)
- B62D 33/023 (2006.01)
- E05F 15/40 (2015.01)
- E05F 15/611 (2015.01)

(52) U.S. Cl.
CPC ............... *B60J 5/104* (2013.01); *B60J 5/108* (2013.01); *B60P 1/003* (2013.01); *B60P 1/267* (2013.01); *B60P 1/44* (2013.01); *B60P 1/4407* (2013.01); *B60P 1/4414* (2013.01); *B62D 33/023* (2013.01); *B62D 33/027* (2013.01); *B62D 33/0273* (2013.01); *B62D 33/03* (2013.01); *E05F 15/40* (2015.01); *E05F 15/611* (2015.01); *E05Y 2400/44* (2013.01); *E05Y 2900/546* (2013.01)

(58) Field of Classification Search
CPC .. B60J 5/103; B60J 5/104; B60J 5/108; B60P 1/003; B60P 1/267; B60P 1/44; B60P 1/4407; B60P 1/4414; B62D 33/023; B62D 33/027; B62D 33/0273; B62D 33/03

See application file for complete search history.

(56) References Cited

U.S. PATENT DOCUMENTS

| | | | | |
|---|---|---|---|---|
| 9,068,390 | B2* | 6/2015 | Ihlenburg et al. | E05F 15/40 |
| 2003/0018419 | A1* | 1/2003 | Zhou et al. | E05F 15/40 701/36 |
| 2014/0025262 | A1* | 1/2014 | Eggeling et al. | B60J 5/103 701/49 |
| 2015/0330135 | A1 | 11/2015 | Mayr | |

FOREIGN PATENT DOCUMENTS

| | | | |
|---|---|---|---|
| DE | 10 2010 034 203 B3 | 11/2011 | |
| DE | 10 2010 023 398 A1 | 12/2011 | |
| DE | 10 2010 048 758 A1 | 4/2012 | |
| DE | 102011087315 A1 * | 5/2013 | ............. B60J 5/101 |
| DE | 10 2011 121 410 A1 | 6/2013 | |
| DE | 102011121410 A1 * | 6/2013 | ............. E05F 15/70 |
| DE | 10 2013 201 436 A1 | 7/2014 | |
| JP | 2002-364249 A | 12/2002 | |
| JP | 2009-221760 A | 10/2009 | |
| JP | 2010-77714 A | 4/2010 | |

OTHER PUBLICATIONS

Chinese-language Office Action issued in counterpart Chinese Application No. 201580040529.9 dated Aug. 30, 2017 with English translation (Twelve (12) pages).

International Search Report (PCT/ISA/210) issued in PCT Application No. PCT/EP2015/069071 dated Oct. 23, 2015 with English translation (six pages).

German-language Written Opinion (PCT/ISA/237 ) issued in PCT Application No. PCT/EP2015/069071 dated Oct. 23, 2015 (four pages).

German Search Report issued in counterpart German Application No. 10 2014 216 759.0 dated Sep. 16, 2014 with partial English translation (10 pages).

Chinese-language Office Action issued in counterpart Chinese Application No. 201580040529.9 dated May 15, 2018 with English translation (fifteen (15) pages).

Chinese-language Office Action issued in counterpart Chinese Application No. 201580040529.9 dated Sep. 19, 2018 with English translation (11 pages).

* cited by examiner

MOTOR VEHICLE HAVING AN AUTOMATICALLY CONTROLLABLE REAR-FLAP ASSEMBLY

CROSS REFERENCE TO RELATED APPLICATIONS

This application is a continuation of PCT International Application No. PCT/EP2015/069071, filed Aug. 19, 2015, which claims priority under 35 U.S.C. § 119 from German Patent Application No. 10 2014 216 759.0, filed Aug. 22, 2014, the entire disclosures of which are herein expressly incorporated by reference.

BACKGROUND AND SUMMARY OF THE INVENTION

The invention relates to a motor vehicle having an automatically controllable tailgate arrangement either composed of a single pivotable tailgate or composed of a pivotable lower tailgate and of a pivotable upper tailgate.

An automatically controllable tailgate arrangement composed of a pivotable lower tailgate and of a pivotable upper tailgate is known for example from DE 10 2010 034 203 B3. Here, consideration is given to the situation in which there is a risk of collision for both tailgates in their overlap region. For example, if it is sought to open only the lower tailgate, but it is sought for the upper tailgate to be closed, the upper tailgate is automatically initially opened and is closed again after the opening of the lower tailgate. This usage situation can present an unpleasant surprise to the user.

DE 10 2013 201 436 A1 discloses, for example, an automatically controllable tailgate arrangement composed of a single pivotable tailgate. The subject matter of said application relates to a means for blockage detection during automatic adjustment of the tailgate. Current vehicles with an automatically opening or closing tailgate commonly have, in a controller, a regulation logic arrangement for the detection and prevention of a trapping or blocking situation.

It is an object of the invention to provide a further user-friendly control device for the abovementioned tailgate arrangement.

This and other objects are achieved according to the invention by way of a motor vehicle having an automatically controllable tailgate arrangement composed of a single pivotable tailgate or composed of a pivotable lower tailgate and of a pivotable upper tailgate, having an electronic control unit for the motor-driven actuation of the tailgate arrangement, wherein the control unit is designed such that said control unit evaluates information from a sensor unit for sensing the longitudinal inclination of the motor vehicle. And, following an opening command from an operating person, the control unit, at least in the presence of a rearward longitudinal inclination exceeding a certain threshold, prevents at least a complete opening either of the single tailgate or at least of the lower tailgate.

The motor vehicle according to the invention has an automatically controllable tailgate arrangement either composed of a single pivotable tailgate or composed of a pivotable lower tailgate and of a pivotable upper tailgate. The tailgate arrangement is assigned an electronic control unit for the motor-driven actuation of the tailgate(s). The control unit is, in particular by way of a correspondingly programmed function module, configured for implementing the following functionality:

1) The control unit evaluates the information from a sensor unit for sensing the longitudinal inclination of the motor vehicle.

2) Following an opening command from an operating person, the control unit, at least in the presence of a rearward longitudinal inclination exceeding a certain threshold, prevents at least a complete opening either of the single tailgate (in the case of a single-part tailgate arrangement) or at least of the lower tailgate (in the case of a two-part tailgate arrangement with a lower tailgate and an upper tailgate).

The control unit is preferably configurable, by way of a user interface connected thereto, with regard to whether an at least complete opening is prevented in the presence of an opening command, or with regard to which particular opening command prevents an at least complete opening. An opening command may be input, for example, by remote control via a transponder (smart key) or by way of a button in the passenger compartment, for example in the vicinity of the driver's seat. An opening command may, however, also be input by way of a button directly on a tailgate or by way of a foot-controlled opening mechanism below a tailgate arrangement. It is preferably possible for the control unit to be configured to perform the prevention, at least of a complete opening of a corresponding tailgate as mentioned above, only in the case of an opening command being input by remote control.

The control unit may also be configurable, by way of a user interface connected thereto, such that the threshold of the longitudinal inclination can be varied by the operating person.

It is also possible for the control unit to be configurable, by way of a user interface connected thereto, such that the degree of opening, beyond which further opening is prevented, can be set by the operating person. The degree of opening may however also be zero; that is to say for example that the lock device of the lower tailgate is not energized for opening purposes in the first place.

The invention prevents a situation in which the payload—in particular in the case of vehicles with a flat loading floor or with only a very small height of the loading edge above the loading floor—slides out of the vehicle in an undesired manner.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
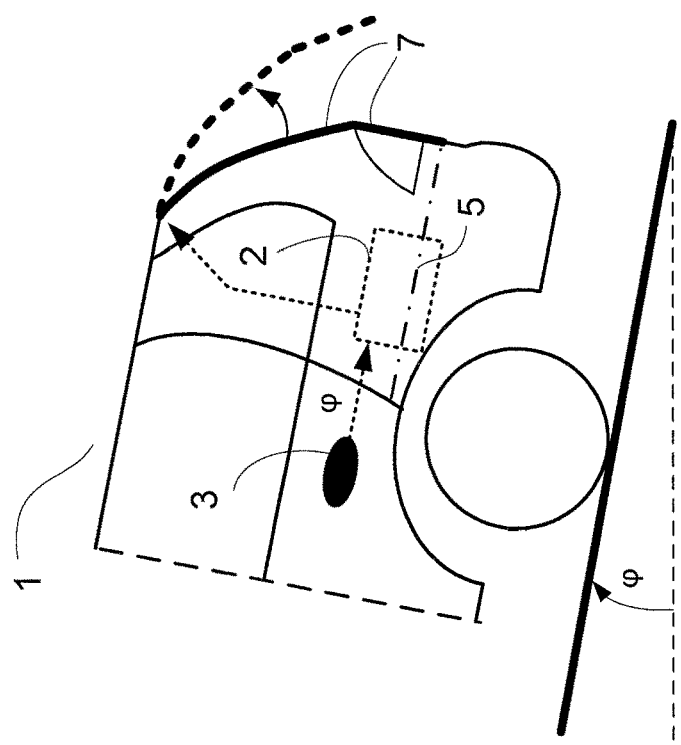
FIG. 1 is a schematic diagram illustrating the most important functional components of the invention in the case of a two-part tailgate arrangement.
Figure 2:
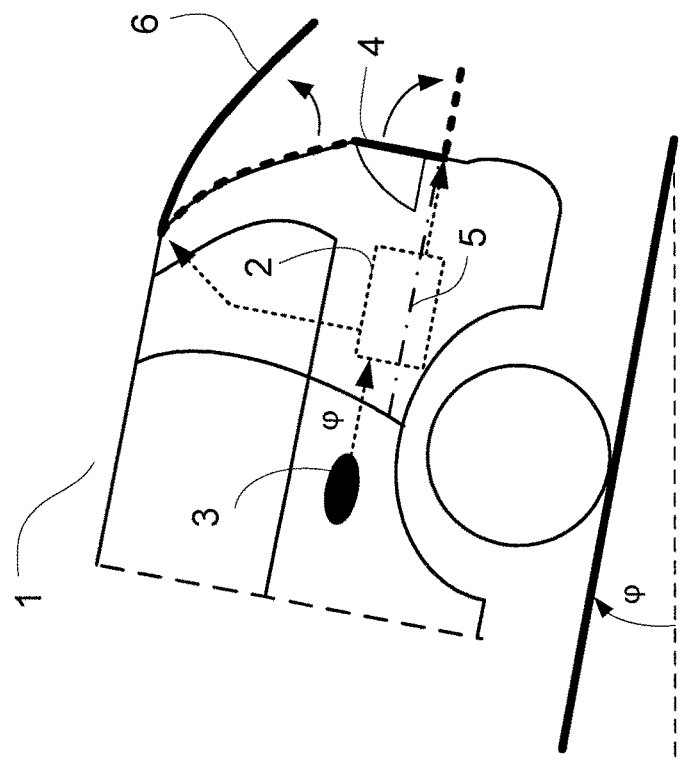
FIG. 2 is a schematic diagram illustrating the most important functional components of the invention in the case of a single-part tailgate arrangement.

In FIGS. 1 and 2, identical components are denoted by the same reference designations.

Both figures show the rear-end region of a motor vehicle 1 having an electronic control unit 2, such as is known per se, for the actuation of a two-part tailgate arrangement (FIG. 1) having a lower tailgate 4 and an upper tailgate 6, or for the actuation of a single-part tailgate arrangement (FIG. 2) having a single tailgate 7. The electronic control unit 2 may be integrated into a control device which is already provided in any case for the energization of the locks, or may be a separate central control device.

The control unit 2 receives, as an input signal, information from a sensor unit 3 such as is known per se, which sensor unit senses the longitudinal inclination $\varphi$ of the motor vehicle.

Dash-dotted lines indicate the loading area 5 from which, in particular in the case of a very low loading edge or in the absence of a loading edge, and depending on the type of payload, said payload can, in the presence of a relatively steep longitudinal inclination $\varphi$, slide out when the tailgate arrangement is opened.

Therefore, according to the invention, in the case of a tailgate arrangement as per FIG. 1, following an opening command from an operating person, at least in the presence of a longitudinal inclination $\varphi$ exceeding a predefined threshold (which in the extreme case may also be zero), an automatic opening at least of the lower tailgate 4 is prevented. Analogously, in the case of a tailgate arrangement as per FIG. 2, following an opening command from an operating person, an automatic opening of the single tailgate 7 is prevented.

It is possible for an operating person to be allowed to input various opening commands, which may be configurable by way of a selection menu of an on-board computer.

For example, in the case of an opening command being input by remote control, the prevention according to the invention of the respective tailgate opening may be activated at all times. However, an opening command input by way of a button on or in the vicinity of the tailgate arrangement may be configurable selectively for activation or deactivation of the prevention according to the invention of the respective tailgate opening. It may, however, basically be provided that each possible opening command is possible by way of corresponding programming of the control unit 2 and by way of corresponding configuration by way of a user interface. The threshold of the longitudinal inclination $\varphi$ may also be variable by these means. It would also be possible for a maximum admissible degree of opening to be predefinable, rather than a complete prevention of an opening process.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle, comprising:
    an automatically controllable tailgate arrangement which either comprises a single pivotable tailgate or comprises a pivotable lower tailgate and a pivotable upper tailgate;
    an electronic control unit operatively configured for motor-driven actuation of the tailgate arrangement, wherein
    the electronic control unit is operatively configured to:
        evaluate information from a sensor unit that senses a longitudinal inclination of the motor vehicle,
        following an opening command from an operating person, prevent at least a complete opening of either the single pivotable tailgate or the pivotable lower tailgate when the longitudinal inclination of the motor vehicle exceeds a defined threshold, and
        the defined threshold of the longitudinal inclination is variable based on an input of the operating person via a user interface.

2. The motor vehicle according to claim 1, wherein, via a user interface connected with the electronic control unit, the electronic control unit is configurable so as to prevent the complete opening in the presence of the opening command or so as to prevent the at least complete opening in the presence of a particular opening command.

3. The motor vehicle according to claim 2, wherein the complete opening is prevented only when the opening command is from a remote control.

4. The motor vehicle according to claim 2, wherein the complete opening is not prevented when the opening command is from a button in a vicinity of the tailgate arrangement.

5. The motor vehicle according to claim 1, wherein, the user interface is connected to the electronic control unit.

6. The motor vehicle according to claim 5, wherein the electronic control unit is configurable such that a degree of opening beyond which further opening is prevented is settable based on an input by the operating person.

7. A method of operating an automatically controllable tailgate arrangement of a motor vehicle, the tailgate arrangement comprising either a single pivotable tailgate or a pivotable lower tailgate and a pivotable upper tailgate, the method comprising the acts of:
    evaluating, via an electronic control unit configured to actuate the tailgate arrangement, information from a sensor unit in the motor vehicle, the sensor unit sensing a longitudinal inclination of the motor vehicle;
    receiving, by the electronic control unit, an opening command for the tailgate arrangement from an operating person; and
    preventing, by the electronic control unit, at least a complete opening of either the single pivotable tailgate or the lower pivotable tailgate upon receipt of the opening command when the longitudinal inclination of the motor vehicle exceeds a defined threshold, wherein the defined threshold of the longitudinal inclination is variable based on an input of the operating person via a user interface.

8. The method according to claim 7, further comprising the act of:
    evaluating the received opening command; and
    only preventing the complete opening of either the single pivotable tailgate or the lower pivotable tailgate as a function of a particular opening command.

9. The method according to claim 8, wherein the opening is prevented only when the opening command is from a remote control.

10. The method according to claim 7, wherein a degree of opening beyond which further opening is prevented is variable.

* * * * *